Feb. 23, 1932. W. C. LEINGANG 1,846,214
SYSTEM FOR THE CONTROL OF THE CHARGE OF A STORAGE BATTERY
Filed July 30, 1931
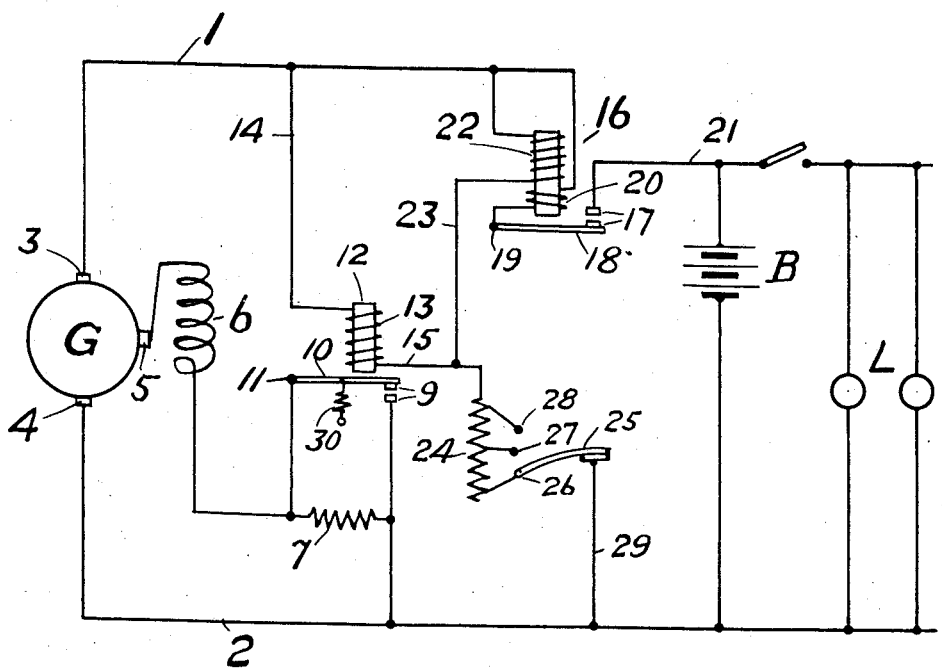
WITNESS:
INVENTOR
William C. Leingang
BY
Augustus B. Stoughton
ATTORNEY.

Patented Feb. 23, 1932

1,846,214

UNITED STATES PATENT OFFICE

WILLIAM C. LEINGANG, OF DETROIT, MICHIGAN

SYSTEM FOR THE CONTROL OF THE CHARGE OF A STORAGE BATTERY

Application filed July 30, 1931. Serial No. 554,001.

The object of my invention is to improve a storage battery charging circuit having a generator, a switch for connecting the battery to the generator, and means for varying the charging rate of the generator to a high or a low rate. My improvement consists in placing a thermostat responsive to the temperature of the surrounding air in series with both the switch and the actuating means which controls the means for varying the charging rate, the two latter elements being connected in parallel. There is thus provided means whereby the battery is always connected to the generator to first receive a charge at the high rate.

For a further description of my invention reference may be had to the annexed drawing and specification at the end whereof my invention will be specifically pointed out and claimed.

The accompanying drawing is a diagram showing my improved circuit.

In the drawing, G is a charging generator here shown as of the third brush type, whose main brushes 3 and 4 are connected respectively to the conductors 1 and 2. B is a storage battery connected at one terminal to the conductor 2 and at the other terminal, via conductor 21 and the contacts 17 of automatic switch 16, to conductor 1. L represents a load circuit which may be connected to the battery B and to the generator G. The field winding 6 of the generator G is connected between the third brush 5 and conductor 2 and in series with this field winding is a resistor 7 adapted to be short circuited by the contacts 9 of a voltage responsive relay whose armature 10 is pivoted at 11. The armature 10 is held in position to close the contacts 9 by its own weight or by the spring 30 or both and is attracted to open the contacts at 9 by the electromagnet 12, whose coil 13 is connected at one end by conductor 14 to conductor 1 and at the other end by conductor 15 through adjustable resistor 24 and bimetallic strip 25 actuated by the temperature of the surrounding atmosphere and conductor 29 to conductor 2. The coil 13 is thus connected across the main brushes of the generator G and is therefore responsive to its voltage. The automatic switch indicated generally at 16 may be of any well known type adapted to connect the generator G to the battery B when the voltage of the generator reaches a predetermined value, this switch being provided with contacts 17, one of which is supported on the armature 18, pivoted at 19. The switch has the usual series coil 20 and a shunt coil 22 connected at one end to conductor 1 and at the other end, via conductor 23 through resistor 24 and bimetallic strip 25 and conductor 29, to conductor 2. It will be seen that coils 13 and 22 are connected in parallel and the current passing through them is controlled simultaneously by the adjustment of the variable resistor 24. This resistor is provided with a series of contact points 26, 27 and 28 over which the free end of the bimetallic strip 25 passes as its curvature changes in response to variations of temperature in the well known manner.

The control of the excitation of the voltage responsive coil 13 by means of the temperature responsive device including the resistor 24 and the bimetallic strip 25 is similar to that described in my prior application Serial No. 412,016, filed Dec. 6, 1929, and its object is, as in the prior application, to provide for reducing the charging rate of the battery from a higher to a lower value in response to the voltage applied to the battery and to adjust the value of the voltage at which this change is effected for a higher value in winter than in summer since the voltage of the battery while charging is higher at low temperature than at higher temperatures, other conditions being the same. The adjustment is such that when the desired voltage is reached the magnet 12 lifts the armature 10, opening the contacts at 9 and thus inserting the resistor 7 in series with field coil 6, thereby reducing the voltage and the output of generator G.

It is important that the automatic switch 16 shall always close before the generator voltage reaches a value sufficient to open the contacts 9 of the voltage responsive relay since it is always desirable to start the charge of the battery at the high rate. If the shunt coil 22 of the automatic switch is connected directly across conductors 1, 2 and the adjustment is such that in cold weather the automatic switch closes before the voltage responsive relay opens its contacts 9, in warm weather when the voltage at which the contacts 9 are opened is reduced by means of the thermal responsive device and when, on account of the increased resistance of coil 22 at higher temperatures, the voltage at which the automatic switch closes is greater, conditions may arise which will cause the automatic switch to close only after the contacts at 9 have been opened and the battery will never get the high rate charge. To obviate this difficulty, I have so connected the two coils 13 and 22 that they are both controlled in parallel by the thermal responsive device. When therefore in response to higher temperatures the bimetallic strip cuts out some or all of the resistance 24, thus causing the voltage responsive relay to open the contacts 9 at a lower voltage, the automatic switch will also close at a lower voltage and by proper design and adjustment, the apparatus may be caused to function so that the automatic switch will always close before the contacts at 9 are opened regardless of changes of temperature.

I do not intend to be limited in the practice of my invention save as the scope of the prior art and of the attached claims may require.

I claim:

1. In combination, a battery, a generator and its circuit, an automatic switch adapted to connect the generator to the battery at a predetermined generator voltage, said switch having a closing coil connected across the generator terminals, and means for adjusting the generator output selectively at either a higher or lower value, said means including an actuating coil connected across the generator circuit, and a variable resistor connected in series both with the closing coil and with the actuating coil and means responsive to the surrounding temperature for varying said resistance.

2. In combination, a battery, a generator and its circuit, an automatic switch adapted to connect the generator to the battery at a predetermined generator voltage, said switch having a closing coil connected across the generator terminals, and means for adjusting the generator output selectively at either a higher or lower value, said means including an actuating coil connected across the generator circuit, and means responsive to the temperature of its surroundings and connected in series with both the closing coil and the actuating coil for varying the voltage at which said coils operate.

WILLIAM C. LEINGANG.